United States Patent

Kato et al.

[11] Patent Number: 4,707,392
[45] Date of Patent: * Nov. 17, 1987

[54] FLEXIBLE MAGNETIC DISK

[75] Inventors: Mikihiko Kato; Yasutoshi Okuzawa; Shigeo Komine; Kazuhiko Morita, all of Kanagawa, Japan

[73] Assignee: Fuji Photo Film Co., Ltd., Kanagawa, Japan

[*] Notice: The portion of the term of this patent subsequent to Apr. 8, 2003 has been disclaimed.

[21] Appl. No.: 706,568

[22] Filed: Feb. 28, 1985

[30] Foreign Application Priority Data

Feb. 29, 1984 [JP] Japan .................................. 59-38260
Feb. 29, 1984 [JP] Japan .................................. 59-38261

[51] Int. Cl.$^4$ .............................................. G11B 5/72
[52] U.S. Cl. ........................................ 428/65; 427/44;
427/54.1; 427/128; 427/131; 428/64; 428/137;
428/141; 428/143; 428/148; 428/195;
428/425.9; 428/522; 428/694; 428/695;
428/900

[58] Field of Search ................ 428/695, 694, 425.9,
428/900, 64, 65, 137, 195, 336, 480, 64, 65, 522,
141, 143, 148; 427/44, 54.1, 128, 131;
252/62.54; 360/134-136

[56] References Cited

U.S. PATENT DOCUMENTS

| | | | |
|---|---|---|---|
| 3,466,156 | 9/1969 | Peters | 427/132 |
| 3,681,225 | 8/1972 | Genma | 427/132 |
| 4,239,828 | 12/1980 | Knope | 428/121 |
| 4,335,183 | 6/1982 | Hosaka | 428/694 |
| 4,368,239 | 1/1983 | Nakajima | 428/522 |
| 4,387,114 | 6/1983 | Conner | 427/54.1 |
| 4,404,247 | 9/1983 | Dominguez-Burquette | 428/900 |
| 4,434,210 | 2/1984 | Nakajima | 427/44 |
| 4,486,500 | 12/1984 | Naruo | 428/695 |
| 4,523,246 | 6/1985 | Okuzawa | 360/132 |
| 4,539,220 | 9/1985 | Martinelli | 428/900 |
| 4,578,299 | 3/1986 | Kato | 428/694 |
| 4,581,270 | 4/1986 | Kato | 428/694 |
| 4,647,473 | 3/1987 | Kato | 428/694 |
| 4,652,480 | 3/1987 | Kato | 428/694 |

Primary Examiner—Ellis P. Robinson
Attorney, Agent, or Firm—Sughrue, Mion, Zinn, Macpeak, and Seas

[57] ABSTRACT

A flexible magnetic disk in which the friction between the magnetic sheet of the disk and a positioning member is reduced, the magnetic sheet is positioned properly and without offset each time it is loaded in a reading/reproducing device, and the tracking accuracy and dimensional accuracy are satisfactory. A protective layer is provided around the periphery of a central hole in the magnetic sheet. The protective layer is made of a composition containing a compound which has an acrylic or methacrylic acid ester bond at one or both of a main chain terminal and a side chain thereof. The compound is one which is cured by radiation. The thickness of the protective layer should be 30 microns or less, and the surface irregularity of the protective layer should be 0.03 microns or more represented in terms of a central line average roughness at a cutoff of 2.5 mm.

36 Claims, 7 Drawing Figures

FLEXIBLE MAGNETIC DISK

BACKGROUND OF THE INVENTION

The present invention relates to an improved flexible magnetic disk. More particularly, the invention is concerned with a flexible magnetic disk which can be loaded in a disk reading/writing device without offset in its mounting position.

As is well known, magnetic recording or reproduction of a flexible magnetic disk in which an annular magnetic sheet is carried in a protective jacket is performed by bringing central holes formed in both the magnetic sheet and jacket into engagement with a disk-positioning member of a writing or reading device and then rotating the magnetic sheet. In this type of magnetic disk arrangement, the jacket is designed to accomodate the magnetic sheet with some clearance therebetween. For this reason, the disk can move in the jacket and settle at an off-center position during storage or handling or while it is being carried. In such a case, when the disk is set on the writing or reading device, the center of the hole in the center of the magnetic sheet is positioned radially offset from the center axis of the positioning member (collet) and, during the positioning process, the magnetic sheet is held in the deviated position.

Referring to FIGS. 1A and 1B, there is shown a flexible magnetic disk of the above-described type. A circular flexible magnetic sheet 2 with a hole 2a in the center thereof is loosely carried in a rectangular jacket 1 with a circular opening 1a in the center thereof, with the hole 2a being smaller in diameter than the opening 1a so that the periphery of the hole 2a is exposed.

In loading the flexible magnetic disk on the reading/writing device, as illustrated in FIG. 2, a rotary part 3 of the positioning member is adapted to support the sheet 2 from the bottom thereof, and the collet 4 is lowered and placed under pressure in a circular concave portion 3a of the rotary part 3. In this case, the periphery of the hole 2a of the magnetic sheet 2 does not always properly align with the edges of the circular concave portion 3a of the rotary part; rather they are often positioned so that their centers are offset from each other. Thus, if the collet 4 is lowered in such a condition, part of the periphery of the hole 2a of the magnetic sheet 2 is, as shown in FIG. 3, sandwiched between the collet 4 and the concave portion 3a of the rotary part 3, and the magnetic sheet 2 rotates in such a deviated condition. Proper writing or reading cannot be achieved unless the magnetic sheet 2 rotates in the condition that its center is aligned with the rotary central axis. Therefore, such offset positioning should be eliminated.

Furthermore, if the magnetic sheet is held in the offset condition and rotated, it becomes difficult to maintain it in the horizontal plane and thus the magnetic sheet fails to rotate smoothly. That is, when the collet 4 is lowered, the magnetic sheet 1 should be held not as shown in FIG. 3 but as shown in FIG. 4. For this purpose, it is necessary that the periphery of the hole of the sheet have a suitable hardness and that the coefficient of friction among the magnetic sheet 1, the collet 4 and the rotary part 3 be small.

As a means of reducing such a coefficient of friction U.S. Pat. No. 4,387,114 discloses a procedure in which a protective layer made of a polyolefin material polymerizable with irradiation with ultraviolet rays and a fatty acid ester is provided on a portion of the periphery of the hole in the center of the flexible magnetic disk. This portion is that which comes into contact with the positioning member.

Provision of such a protective layer, however, causes other problems. For example, if the thickness of the protective layer is too great, there is undesirably a danger of track displacement occurring during operation. Furthermore, the amount of shrinkage during the curing process (polymerization shrinkage) is large, thereby adversely affecting the planarity of the flexible magnetic disk. This reduction in dimensional accuracy adversely affects the tracking accuracy.

In addition, Japanese Patent Applications Nos. 130438/83, 130439/83 and 219607/83 disclose a method of reducing the coefficient of friction by providing a protective layer which is made of resins curable by irradiation with ultraviolet rays and various lubricants. The effect of such protective layers, however, is often insufficient.

SUMMARY OF THE INVENTION

Accordingly, an object of the present invention is to provide a flexible magnetic disk in which the friction between a magnetic sheet and a positioning member is reduced, the magnetic sheet can be positioned properly and without offset, and, furthermore, the tracking accuracy and dimensional accuracy are satisfactory.

The present inventors, therefore, have made extensive investigations regarding a protective layer containing radiation-curable resins. As a result, it has been found that if the protective layer is reduced in thickness and the surface of the protective layer is made irregular, the coefficient of friction can be reduced. On the basis of these findings, the present invention has been accomplished.

In accordance with the above and other objects, the present invention provides a flexible magnetic disk with a protective layer formed around a hole in the center of a flexible magnetic sheet, wherein the protective layer is made of a composition containing a compound having an unsaturated bond polymerizable and cured by radiation, and wherein the surface irregularity of the protective layer is 0.03 microns or more represented in terms of a central line average roughness (Ra) at a cutoff of 0.25 mm. The measurement for surface roughness (Ra) is defined in Japanese Industrial Standard (JIS) B0601.

As mentioned above, in accordance with the present invention, the surface irregularity of the protective layer is preferably 0.03 microns or more, and, more preferably, 0.1 microns or more, when represented in terms of a central line average roughness (Ra) of 2.5 mm. The surface irregularity of the protective layer can be controlled by a method of providing the protective layer, adjusting the levelling time of the protective layer, the choice of the levelling agent, or the use of a matting agent. If the surface irregularity is less than 0.03 microns, the coefficient of friction with respect to the rotary part is increased and the loading to the disk drive becomes difficult.

Further, the present invention provides a flexible magnetic disk with a hole formed in the center thereof and with a protective layer provided around the periphery of the hole, wherein the protective layer is made of a composition containing a compound which has an acrylic or methacrylic acid ester bond at one or both of the main chain terminal and the side chain cured with radiation, wherein the thickness of the protective layer is 30 microns or less. In addition, the surface irregularity of the protective layer is 0.03 microns or more when represented in terms of a central line average roughness (Ra) at a cutoff of 0.25 mm.

Compounds having unsaturated bonds which can be used in practicing the present invention are those containing an acrylic or methacrylic acid ester bond at one or both of the main chain terminal and the side chain, wherein the number of the ester bonds per molecular weight of 1,000 is 1 to 10, preferably 1 to 6, and more preferably 2 to 4. The molecular weight is not critical; it is preferably in a range of 500 to 30,000, and more preferably 1,000 to 20,000, ranging from an oligomer range to a polymer range. The skeleton of the main chain is preferably a polyester skeleton, a polyurethane skeleton, a polyether skeleton, a polycarbonate skeleton, an epoxy resin skeleton, or a mixture thereof. Two or more compounds having different skeletons may be used in combination.

The term "radiation" as used herein includes both low energy radiation such as ultraviolet rays and high energy radiation such as alpha rays, X rays and electron rays. Of these ultraviolet rays are preferred in that the generation thereof is quite simple.

In a case where ultraviolet rays are used, it is preferred to add aromatic ketones as photo-polymerization initiators. The choice of aromatic ketone is not critical, but preferred are those having a relatively large absorbance at wavelengths of 254, 313 or 365 nm at which a mercury lamp commonly used as an ultraviolet-ray source produces a bright line. Typical examples of such aromatic ketones are acetophenone, benzophenone, benzoin ethyl ether, benzylmethyl ketal, benzylethyl ketal, benzoin isobutyl ketone, hydroxy dimethylphenyl ketone, 1-hydroxycyclohexyl phenyl ketone, 2,2-diethoxyacetophenone, and Michler's ketone. The amount of the aromatic ketone used is from 0.5 to 20 parts by weight, preferably from 2 to 15 parts by weight, and more preferably from 3 to 10 parts by weight, per 100 parts by weight of the above compound.

In order to reduce the coefficient of friction, it is preferred in the present invention to add lubricants to the above composition. As these lubricants, saturated or unsaturated fatty acids and their esters and amides, silicone-based lubricants, lubricants such as mineral oils, vegetable oils, and fluorine-based compounds, and solid lubricants such as graphite, silicon dioxide, molybdenum disulfide, tungsten disulfide, boron nitride, fluorinated graphite, and metal oxides. The amount of the lubricant used is preferably 1 to 10 parts by weight per 100 parts by weight of the above compound.

In preparing the coating solution various organic solvents may be used if necessary.

The thickness of the protective layer is 30 microns or less, preferably 15 microns or less, and more preferably 7 microns or less. The surface irregularity of the protective layer is preferably 0.03 microns or more, and more preferably 0.1 microns or more.

If the thickness of the protective layer is more than 30 microns, tracking offset is observed, which makes the disk unsuitable for practical use. Moreover, the appearance is poor; the surface is not planar. On the other hand, if the thickness is 30 microns or less, no problem arises because tracking offset is observed only slightly. If it is 7 microns or less, no tracking offset at all is observed. Best results are obtained when the thickness of the protective layer is 4 microns or less.

The protective layer is formed by techniques such as screen printing, french or polish printing, and offset printing. For forming a thick protective layer, offset printing is best, but french printing is also suitable for this purpose.

DESCRIPTION OF THE PREFERRED EMBODIMENTS

The present invention will now be described in greater detail with reference to the following examples.

Figure 1A:
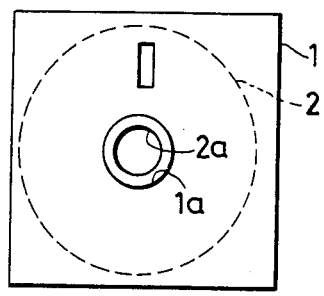
FIG. 1A is a top plan view of a flexible magnetic disk.
Figure 1B:
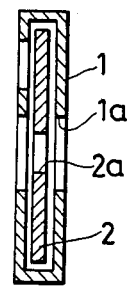
FIG. 1B is a cross-sectional view of the flexible magnetic disk of FIG. 1A.
Figure 2:
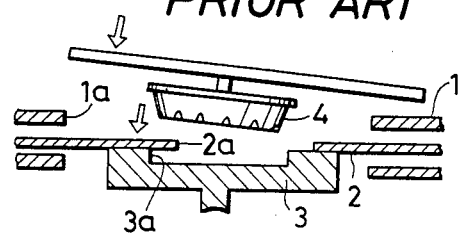
FIG. 2 is a partial cross-sectional view illustrating a state in which the flexible magnetic disk is being loaded by a positioning member of a disk reading/recording apparatus.
Figure 3:
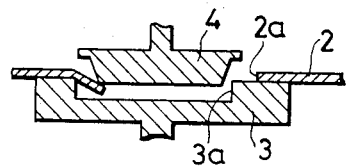
FIG. 3 is a partial cross-sectional view illustrating a state in which the magnetic sheet of the flexible disk is held in an offset position.
Figure 4:
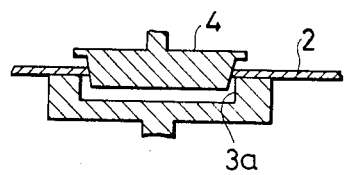
FIG. 4 is a partial cross-sectional view illustrating a state in which the magnetic sheet is held in a proper position.
Figure 5:
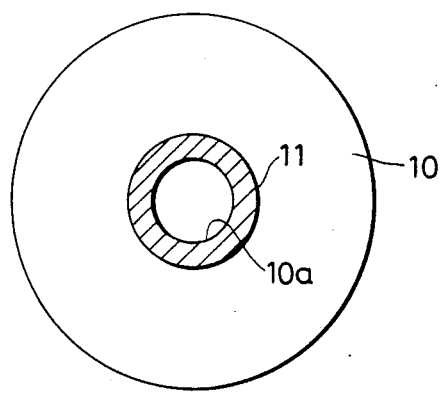
FIG. 5 is a top plan view of the sheet of an embodiment of the present invention.

Referring to FIG. 5, there is shown therein a preferred embodiment of the present invention. A protective layer 11 is provided along the periphery of a hole 10a formed in the center of a flexible magnetic sheet 10 at both the front and rear surfaces of the sheet 10 by offset printing. After depositing the protective layer 11, it is polymerized and cured by irradiation with ultraviolet rays using a 80 W/cm high pressure mercury lamp. The thickness of the protective layer in this example is 3 microns.

The composition of each protective layer in Examples and Comparative Examples is as shown below:

Examples 1 to 6 and Comparative Examples 1 to 2:

| | |
|---|---|
| Polyurethane acrylate "M-1100" produced by Toa Gosei Co., Ltd.: | 100 parts by weight |
| Butyl stearate: | 5 parts by weight |
| Benzyl dimethyl ketal: | 5 parts by weight |

The samples of Examples and Comparative Examples were produced wherein the thickness and surface irregularities of the protective layer were varied as shown in Table 1.

Comparative Example 3:

A sample with no protective layer provided thereon was used.

TABLE 1

| Run No. | Thickness of Protective Layer (microns) | Surface Irregularity of Protective Layer (microns) (Cutoff = 0.25 mm) | Rejection Rate in Loading Test in Disk Drive (%) | Coefficient of Friction with Rotary Part |
|---|---|---|---|---|
| Example 1 | 4 | 0.60 | 0.0 | 0.20 |

TABLE 1-continued

| Run No. | Thickness of Protective Layer (microns) | Surface Irregularity of Protective Layer (microns) (Cutoff = 0.25 mm) | Rejection Rate in Loading Test in Disk Drive (%) | Coefficient of Friction with Rotary Part |
|---|---|---|---|---|
| Example 2 | 7 | 0.60 | 0.0 | 0.20 |
| Example 3 | 15 | 0.60 | 0.0 | 0.20 |
| Example 4 | 30 | 0.60 | 0.0 | 0.20 |
| Example 5 | 4 | 0.10 | 0.0 | 0.20 |
| Example 6 | 4 | 0.03 | 1.0 | 0.20 |
| Comparative Example 1 | 4 | 0.01 | 3.0 | 0.25 |
| Comparative Example 2 | 100 | 0.60 | — | — |
| Comparative Example 3 | — | 0.02 | 18.0 | 0.43 |

The measurement of the coefficient of friction with the positioning member and the loading test in the disk drive for the above Examples and Comparative Examples were carried out under conditions of 20° C. and 80% RH. The results are shown in Table 1.

In measurement of the coefficient of friction, the positioning member (rotary part) was brought into contact with the magnetic sheet and rubbed thereagainst at a speed of 0.8 mm/sec. In this case, the load applied was 70 g. The surface irregularities were measured by the use of a "Surf-Coder" Model SE-3E produced by Kosaka Kukyujo Co., Ltd.

In the loading test in the disk drive, the following drives were used: models YD-280 and YD-380 produced by Y-E Data Co., Ltd.; models JA751 and JA561 produced by Matsushita Tsuko Co., Ltd.; and models M-2894 and M-4853 produced by Mitsubishi Denki Co., Ltd. Ten magnetic disks were used for each drive, and the loading operation was repeated 50 times for each magnetic disk. If the magnetic disk caused trouble during the loading test, it was rated as "bad". The rejection rate was calculated from the number of magnetic disks rated as bad. The results are shown in Table 2.

The results of practical characteristics are shown in Table 2.

TABLE 2

| Run No. | Thickness (microns) | Tracking Offset | Appearance |
|---|---|---|---|
| Example 1 | 4 | Excellent* | Good |
| Example 2 | 7 | Excellent* | " |
| Example 3 | 15 | Good* | " |
| Example 4 | 30 | Tolerable* | " |
| Comparative | 100 | Failure | Distortion |
| Example 2 | | | in plane |

Note:
*Excellent: No tracking offset
Good: No problem
Tolerable: Practically no problem although some tracking offset is observed.
Failure: Unsuitable for practical use.

It is apparent from the above explanation that in order to load the flexible magnetic disk sheet in the disk drive with a high success rate, it is necessary to reduce the coefficient of friction with the rotary part, and that the decrease in the coefficient of friction is effectively attained by providing the protective layer through hardening with ultraviolet rays, for example. A reduction in the thickness of the protective layer allows the dimensions of the magnetic disk sheet to be maintained and for tracking accuracy to be unaffected without causing problems such as an increase in the coefficient of friction and an increase in the loading failure rate. Moreover, it is apparent that making the surface of the protective layer irregular is effective in reducing the coefficient of friction.

Figure 6:
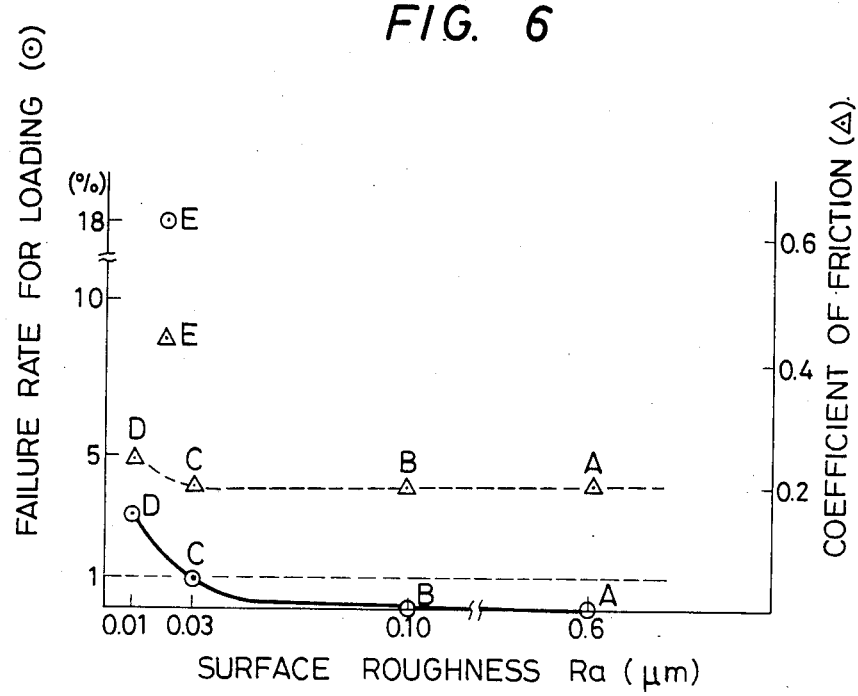
FIG. 6 is a graph showing the relationship between a failure rate in a loading test and a coefficient of friction with respect to a rotary part as a function of a surface irregularity of a disk.

Tests were conducted to compare the failure rate in loading flexible disks of the invention and conventional disks and the coefficients of friction thereof with respect to rotary parts. The results of these tests are shown in the following Table 3 and FIG. 6 of the drawings, wherein the superiority of the flexible disks of the invention is clearly established. For these tests, the coating solution was applied in an amount of 5 g/m² (that is, to a thickness of 13 microns) and thereafter polymerized and cured by irradiation with ultraviolet radiation using an 80 W/cm high pressure mercury lamp.

TABLE 3

| Run No. | Composition of Protective Layer (Parts by weight) | Surface Irregularity of Protective Layer (microns) Cutoff = 0.25 mm | Magnetic Disk Sample |
|---|---|---|---|
| Example 7 | Polyurethane acrylate "M-1100": 100<br>Benzyl methyl Ketal: 5<br>Butyl stearate: 5 | 0.60 | A |
| Example 8 | Polyurethane acrylate "M-1100": 100<br>Benzyl methyl Ketal: 5<br>Butyl stearate: 5 | 0.10 | B |
| Example 9 | Polyurethane acrylate "M-1100": 100<br>Benzyl methyl Ketal: 5<br>Butyl stearate: 5 | 0.03 | C |
| Comparative Example 4 | Polyurethane acrylate "M-1100": 100<br>Benzyl methyl Ketal: 5<br>Butyl stearate: 5 | 0.01 | D |
| Comparative | No protective layer | 0.02 | E |

TABLE 3-continued

| Run No. | Composition of Protective Layer (Parts by weight) | Surface Irregularity of Protective Layer (microns) Cutoff = 0.25 mm | Magnetic Disk Sample |
|---|---|---|---|
| Example 5 | | | |

We claim:

1. A flexible magnetic disk with a hole formed only in a center thereof and with a protective layer formed around said hole, the improvement wherein said protective layer is made of a composition containing a compound which has an acrylic or methacrylic acid ester bond at one or both of a main chain terminal and a side chain thereof and is cured by radiation, a thickness of said protective layer being 30 microns or less and wherein a surface irregularity of said protective layer is 0.03 microns or more represented in terms of a central line average roughness at a cutoff of 0.25 mm.

2. The flexible magnetic disk as claimed in claim 1, wherein said surface irregularity of said protective layer is 0.1 microns or more.

3. The flexible magnetic disk as claimed in claim 1, wherein said compound has a number of ester bonds per molecular weight of 1,000 in a range of 1 to 10.

4. The flexible magnetic disk as claimed in claim 1, wherein said compound has a number of ester bonds per molecular weight of 1,000 in a range of 1 to 6.

5. The flexible magnetic disk as claimed in claim 1, wherein said compound has a number of ester bonds per molecular weight of 1,000 in a range of 2 to 4.

6. The flexible magnetic disk as claimed in claim 1, wherein a molecular weight of said compound is in a range of 500 to 30,000.

7. The flexible magnetic disk as claimed in claim 1, wherein a molecular weight of said compound is in a range of 1,000 to 20,000.

8. The flexible magnetic disk as claimed in claim 1, wherein a skeleton of a main chain of said compound is selected from the group consisting of a polyester skeleton, a polyurethane skeleton, a polyether skeleton, a polycarbonate skeleton, an epoxy resin skeleton, and mixtures thereof.

9. The flexible magnetic disk as claimed in claim 1, wherein said radiation is ultraviolet rays, and wherein said compound further contains an aromatic ketone.

10. The flexible magnetic disk as claimed in claim 9, wherein said aromatic ketone is selected from the group consisting of acetophenone, benzophenone, benzoin ethyl ether, benzylmethyl ketal, benzylethyl ketal, benzoin isobutyl ketone, hydroxy dimethylphenyl ketone, 1-hydroxycyclohexyl phenyl ketone, 2,2-diethoxyacetophenone, and Michler's ketone.

11. The flexible magnetic disk as claimed in claim 9, wherein an amount of said aromatic ketone is in a range of 0.5 to 20 parts by weight.

12. The flexible magnetic disk as claimed in claim 9, wherein an amount of said aromatic ketone is in a range of 2 to 15 parts by weight.

13. The flexible magnetic disk as claimed in claim 9, wherein an amount of said aromatic ketone is in a range of 3 to 10 parts by weight.

14. The flexible magnetic disk as claimed in claim 1, wherein said composition further contains a lubricant.

15. The flexible magnetic disk as claimed in claim 14, wherein said lubricant is selected from the group consisting of saturated and unsaturated fatty acids and esters and amides thereof, silicone-based lubricants, mineral oil, vegetable oil, fluorine-based compounds, graphite, silicone dioxide, molybdenum disulfide, tungsten disulfide, boron nitride, fluorinated graphite, and metal oxides.

16. The flexible magnetic disk as claimed in claim 14, wherein an amount of said lubricant is in a range of 1 to 10 parts by weight per 100 parts by weight of said compound.

17. The flexible magnetic disk as claimed in claim 1, wherein said thickness of said protective layer is 15 microns or less.

18. The flexible magnetic disk as claimed in claim 1, wherein said thickness of said protective layer is 7 microns or less.

19. A flexible magnetic disk with a protective layer provided only around a hole formed in the center of a flexible magnetic sheet, the improvement wherein the protective layer is made of a composition containing a compound having an unsaturated bond polymerizable by and cured by radiation, and a surface irregularity of said protective layer is 0.03 microns or more represented in terms of a central line average roughness at a cutoff of 0.25 mm.

20. The flexible magnetic disk as claimed in claim 19, wherein said compound has a number of ester bonds per molecular weight of 1,000 in a range of 1 to 10.

21. The flexible magnetic disk as claimed in claim 19, wherein said compound has a number of ester bonds per molecular weight of 1,000 in a range of 1 to 6.

22. The flexible magnetic disk as claimed in claim 19, wherein said compound has a number of ester bonds per molecular weight of 1,000 in a range of 2 to 4.

23. The flexible magnetic disk as claimed in claim 19, wherein a molecular weight of said compound is in a range of 500 to 30,000.

24. The flexible magnetic disk as claimed in claim 19, wherein a molecular weight of said compound is in a range of 1,000 to 20,000.

25. The flexible magnetic disk as claimed in claim 19, wherein a skeleton of a main chain of said compound is selected from the group consisting of a polyester skeleton, a polyurethane skeleton, a polyether skeleton, a polycarbonate skeleton, an epoxy resin skeleton, and mixtures thereof.

26. The flexible magnetic disk as claimed in claim 19, wherein said radiation is ultraviolet rays, and wherein said compound further contains an aromatic ketone.

27. The flexible magnetic disk as claimed in claim 26, wherein said aromatic ketone is selected from the group consisting of acetophenone, benzophenone, benzoin ethyl ether, benzylmethyl ketal, benzylethyl ketal, benzoin isobutyl ketone, hydroxy dimethylphenyl ketone, 1-hydroxycyclohexyl phenyl ketone, 2,2-diethoxyacetophenone, and Michler's ketone.

28. The flexible magnetic disk as claimed in claim 26, wherein an amount of said aromatic ketone is in a range of 0.5 to 20 parts by weight.

29. The flexible magnetic disk as claimed in claim 26, wherein an amount of said aromatic ketone is in a range of 2 to 15 parts by weight.

30. The flexible magnetic disk as claimed in claim 26, wherein an amount of said aromatic ketone is in a range of 3 to 10 parts by weight.

31. The flexible magnetic disk as claimed in claim 19, wherein said composition further contains a lubricant.

32. The flexible magnetic disk as claimed in claim 31, wherein said lubricant is selected from the group consisting of saturated and unsaturated fatty acids and esters and amides thereof, silicone-based lubricants, mineral oil, vegetable oil, fluorine-based compounds, graphite, molybdenum disulfide, tungsten disulfide, boron nitride, fluorinated graphite, and metal oxides.

33. The flexible magnetic disk as claimed in claim 31, wherein an amount of said lubricant is in a range of 1 to 10 parts by weight per 100 parts by weight of said compound.

34. The flexible magentic disk as claimed in claim 19, wherein said thickness of said protective layer is 15 microns or less.

35. The flexible magnetic disk as claimed in claim 19, wherein said thickness of said protective layer is 7 microns or less.

36. The flexible magnetic disk as claimed in claim 19, wherein a said surface irregularity of said protective layer is 0.1 microns or more.

* * * * *